UNITED STATES PATENT OFFICE.

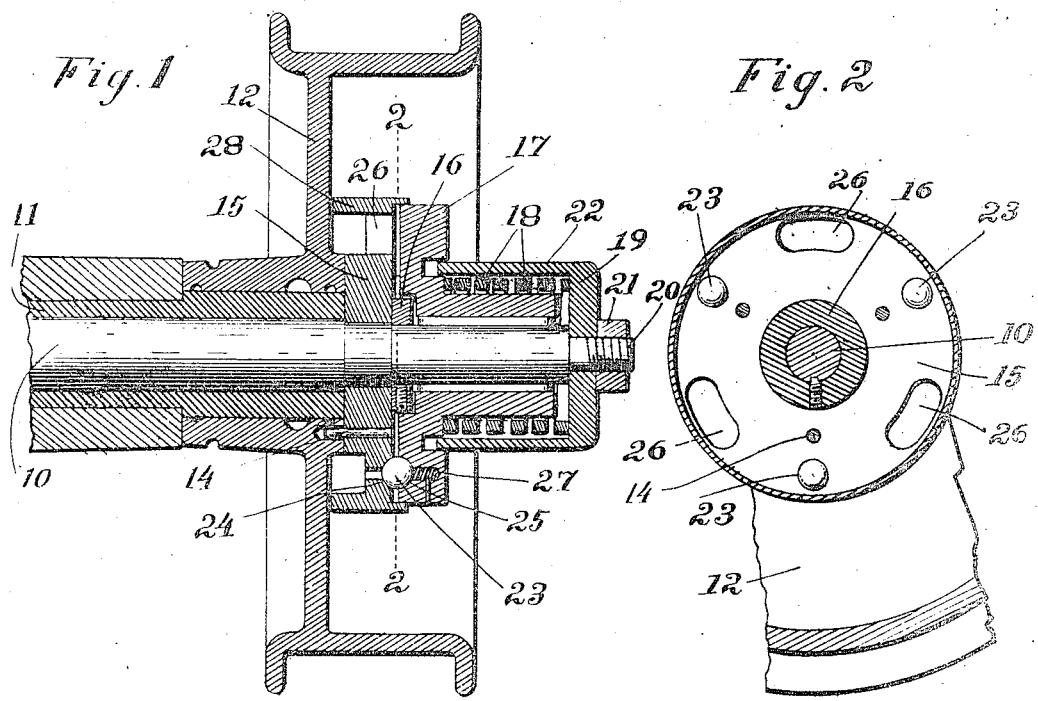

WILLIAM R. WINTER, OF BERLIN, GERMANY, ASSIGNOR TO POTTER AND JOHNSTON MACHINE COMPANY, OF PAWTUCKET, RHODE ISLAND.

SAFETY CLUTCH OR COUPLING.

1,211,515.             Specification of Letters Patent.            Patented Jan. 9, 1917.

Application filed December 15, 1913. Serial No. 806,794.

*To all whom it may concern:*

Be it known that I, WILLIAM R. WINTER, a citizen of the United States, and resident of Berlin, Germany, have invented a certain new and useful Improvement in Safety Clutches or Couplings, and do hereby declare that the following is a full, clear, and exact description thereof.

My invention relates to safety devices for the purpose of preventing breakage or injury to machines, such as the stripping of gears when some obstruction occurs, and the object of my invention is to provide a safety device which will positively connect the driving and driven members under normal conditions, but which are certain to yield when the exigency arises and which will be of simple construction, and to these ends my invention consists in the safety device constructed substantially as hereinafter specified and claimed.

In the accompanying drawings—Figure 1 is a longitudinal section through the main driving shaft of a machine turret lathe, to illustrate an embodiment of my invention adapted to that particular use; Fig. 2 is a fragmentary section on the line 2—2 of Fig. 1.

Referring to the drawings, Figs. 1 and 2, 10 designates the main driving shaft of an automatic turret lathe upon which is mounted a sleeve 11 that forms a bearing for the driving pulley 12. Loose upon the shaft 10, but secured to the outer face of the pulley hub by pins 14 is a circular plate or disk 15, the plate being confined against the outer end of the pulley hub and the outer end of the sleeve, by a collar 16, which is secured to a reduced portion of the shaft 10 that projects beyond the outer side of the circular plate 15. Secured to the outer projecting end of the shaft 10 by suitable keys, is a disk 17 and surrounding the hub of the disk 17 is a coil spring 18, one end of which bears against the outer face of the disk 17 and presses the disk yieldingly toward the outer face of the plate 15, while the other end of the spring 18 bears against a disk 19 which is secured to the outer end of the shaft 10, the latter having at its outer end a reduced, threaded portion 20 over which the disk 19 is slipped, and the disk being clamped between a nut 21 and a shoulder on the shaft. Preferably the disk 19 has a flange 22 that forms a housing or inclosure for the spring 18. It will be seen that the disk 17 is slidably mounted upon the shaft 10 and it is yieldingly pressed toward the circular plate 15 by the action of the spring 18, according to the strength of the latter. The circular plate 15 and disk 17 constitute coöperating members of a clutch by which the pulley and shaft are rotatably connected together, and a separable driving connection is formed between the plate 15 and the disk 17, which, under normal conditions in the operation of the machine clutches the pulley to the shaft, but which under conditions which throw unusual load upon the driving shaft, such for example as some obstruction in the machine, will allow the disconnection of the pulley and driving shaft so that while the rotation of the pulley will continue it will not transmit any power to the driving shaft. Such separable connections are formed of one or more blocks, preferably in the form of balls 23, each of which is adapted to be seated in a depression or cavity 24 in the outer face of the circular plate 15, and the cavity or depression 25 in the opposite face of the disk 17, the ball when seated in opposing cavities 24 and 25 in the respective places acting to clutch the two together so that rotation of the circular plate 15 imparted by the pulley will be imparted to the disk 17 and thereby to the shaft 10.

The depth of the cavity 24 in the circular plate 15 is less than that of the cavity 25 in the disk 17, so that there is a greater portion of the block or ball seated in the disk 17 than in the circular plate 15. As a result of this arrangement, when stoppage of the disk 17 occurs, due to an obstruction, while the rotation of the plate 15 continues, the ball will be disengaged from the cavity 24 in the plate 15, this disengagement being possible by reason of the yielding of the spring 18. In the plate 15 is a slot 26, which by the rotation of the plate after the ball is disengaged therefrom, comes opposite the ball 23 and the ball is ejected through it by the action of a spring 27 seated in an opening in the disk 17, the ball being retained, after being ejected through the slot, by an annular flange or rim 28 on the plate 15. It will thus be seen that the balls are removed from position between the opposing faces of the plate 15 and the disk 17 after an unclutching operation has occurred so that it is impossible for any accidental reëngagement to take place and the knocking or striking of the balls and the corners of the cavities of the members 15 and 17 is obviated. When the obstruction to the running of the machine is removed the two members 15 and 17 are again clutched together by the restoration of the balls to a position between the members 15 and 17 and in the cavities thereof, this operation involving merely the removal of the disk 19 and the member 17 from the shaft in order to enable the balls to be taken out of the chamber in the plate 15 in which they were trapped and then the replacement of the parts.

It will be seen that no alteration of the adjustment of the parts can be made by a workman or attendant which will impair the efficient action of my safety device, and hence, it is certain to act to disengage the driving and driven members when a load is thrown upon the pulley, due to the stoppage of the driving shaft and in excess of the power of the spring, and yet under normal conditions the connection between the driving and the driven members, is a positive one. The collar 16 serves as a stop to prevent the disk 17 when unclutched coming in contact with the face of the driving member 15, and thus friction is avoided since the collar 16 does not revolve with the driving member.

While in both forms of my invention I show balls as the form of the coupling element between the driving and driven members of my safety clutch and in each case show three balls, yet, as I have already indicated the coupling member need not always be in the form of balls, and the number may be varied. It is also to be understood that I do not restrict the employment of my safety clutch, or coupling to use in any particular machine, for it may be employed wherever there are driving and driven members and it is desired to have the driving member unclutched from the driven member when in the operation of the machine, or mechanism, an excess load is thrown on the driving member.

Having thus described my invention what I claim is—

1. The combination of a shaft, a driving clutch member loose on the shaft, a driven clutch member rotatably and slidably connected with the shaft, said members being placed side by side and having cavities in their opposing faces, a ball adapted to be seated in said cavities, the cavity in one member being deeper than in the other, and a spring that yieldingly presses the sliding member toward the driven clutch member, the ball being automatically displaceable from the cavity in the driven member, and a space being provided into which said ball is moved when displaced, whereby automatic reëngagement of the ball with opposing cavities is prevented.

2. The combination of driving and driven members having opposing faces that contain cavities, an automatically displaceable coupling device in the form of a loose body adapted to be seated in opposing cavities, and one of said members having at one side of the cavity therein an opening, and a pocket to which said opening leads, and means for yieldingly holding said device seated in opposing cavities, said device when displaced from said cavities being adapted to pass through said opening into said pocket.

In testimony that I claim the foregoing I have hereunto set my hand.

WILLIAM R. WINTER.

Witnesses:
CHAS. J. WILLIAMSON,
E. H. McLACHLEN.